Aug. 29, 1967 D. B. FITZPATRICK ET AL 3,338,512

LEFT ZERO INSERTION FEATURE

Filed Oct. 11, 1965

10 Sheets-Sheet 1

INVENTORS
DENNIS B. FITZPATRICK
NORMAN E. GREENE

BY Douglas R. McKechnie

ATTORNEY

Aug. 29, 1967 D. B. FITZPATRICK ET AL 3,338,512

LEFT ZERO INSERTION FEATURE

Filed Oct. 11, 1965

10 Sheets-Sheet 4

Aug. 29, 1967 D. B. FITZPATRICK ET AL 3,338,512

LEFT ZERO INSERTION FEATURE

Filed Oct. 11, 1965

10 Sheets-Sheet 5

Aug. 29, 1967 D. B. FITZPATRICK ET AL 3,338,512

LEFT ZERO INSERTION FEATURE

Filed Oct. 11, 1965

10 Sheets-Sheet 9

Aug. 29, 1967 D. B. FITZPATRICK ET AL 3,338,512

LEFT ZERO INSERTION FEATURE

Filed Oct. 11, 1965 10 Sheets-Sheet 10

United States Patent Office 3,338,512

Patented Aug. 29, 1967

3,338,512

LEFT ZERO INSERTION FEATURE

Dennis B. Fitzpatrick, Lagrangeville, and Norman E. Greene, Poughkeepsie, N.Y., assignors to International Business Machines Corporation, Armonk, N.Y., a corporation of New York Filed Oct. 11, 1965, Ser. No. 494,385
11 Claims. (Cl. 234—24)

This invention relates to a left zero insertion feature for data processing machines of the type in which data is recorded on a record media in response to actuation of a keyboard by an operator.

It is common practice to record numerial data on a record media in fields of fixed lengths so that the field is completely filled. If the numerical data to be recorded in a field contains fewer significant digits than the number of positions in the field, a zero is recorded in each of the remaining positions to fill the field. Where a number is represented in the common way, with the units digit in the right hand position and the higher order digits to the left, such zeros are recorded to the left of the highest order significant digit, and these zeros are known as left zeros.

In keyboard operator machines such as card punches of the type disclosed in U.S. Patent 2,647,581, Gardinor et al. any left zeros can be separately or individually keyed; however, such repetitive operator actions does not take full advantage of the capabilities of the machine and the fact that the machine can automatically punch at a rate faster than that at which an operator can key. U.S. Patent 2,737,241, Doty, discloses an improved version of the card punch wherein an operator, when keying a left zero field as defined by program control, first presses a key corresponding to the number of significant digits to cause the appropriate number of left zeros to be punched. Then, the operator keys in the significant digits to fill the field. Quite obviously, such a procedure requires a metal calculation of the number of significant digits and this operation not only involves some delay but also is subject to human error. Thus, one of the objects of the invention is to provide an improved left zero insertion feature for keyboard operated program controlled card punches, which feature makes it unnecessary for the operator to key zeros to the left of significant digits or to mentally calculate either the number of significant digits or left zeros.

Another object is to provide a left zero insertion feature whereby the operator need only key the significant digit and then press a left zero key, in order to fill a left zero field.

Still another object is to provide a left zero insertion feature wherein an operator can correct any mistake made in keying the significant digits prior to pressing a key to initiate punching.

Another object is to provide a left zero insertion feature that can be programmed for a plurality of left zero fields of different lengths or sizes.

A further object is to provide a left zero insertion feature which is operative, when processing a credit figure, to place an 11 punch over the units position of the field after the operator first keys the significant digit and then presses and 11 or dash key, instead of the left zero key, to initiate punch out.

Still another object is to provide a left zero insertion feature that comprises a storage in which data is transferred at least partly under the control of a cyclic device such as a rotary punch shaft.

The foregoing and other objects, features and advantages of the invention will be apparent from the following more particular description of a preferred embodiment of the invention, as illustrated in the accompanying drawings.

Figure 6:
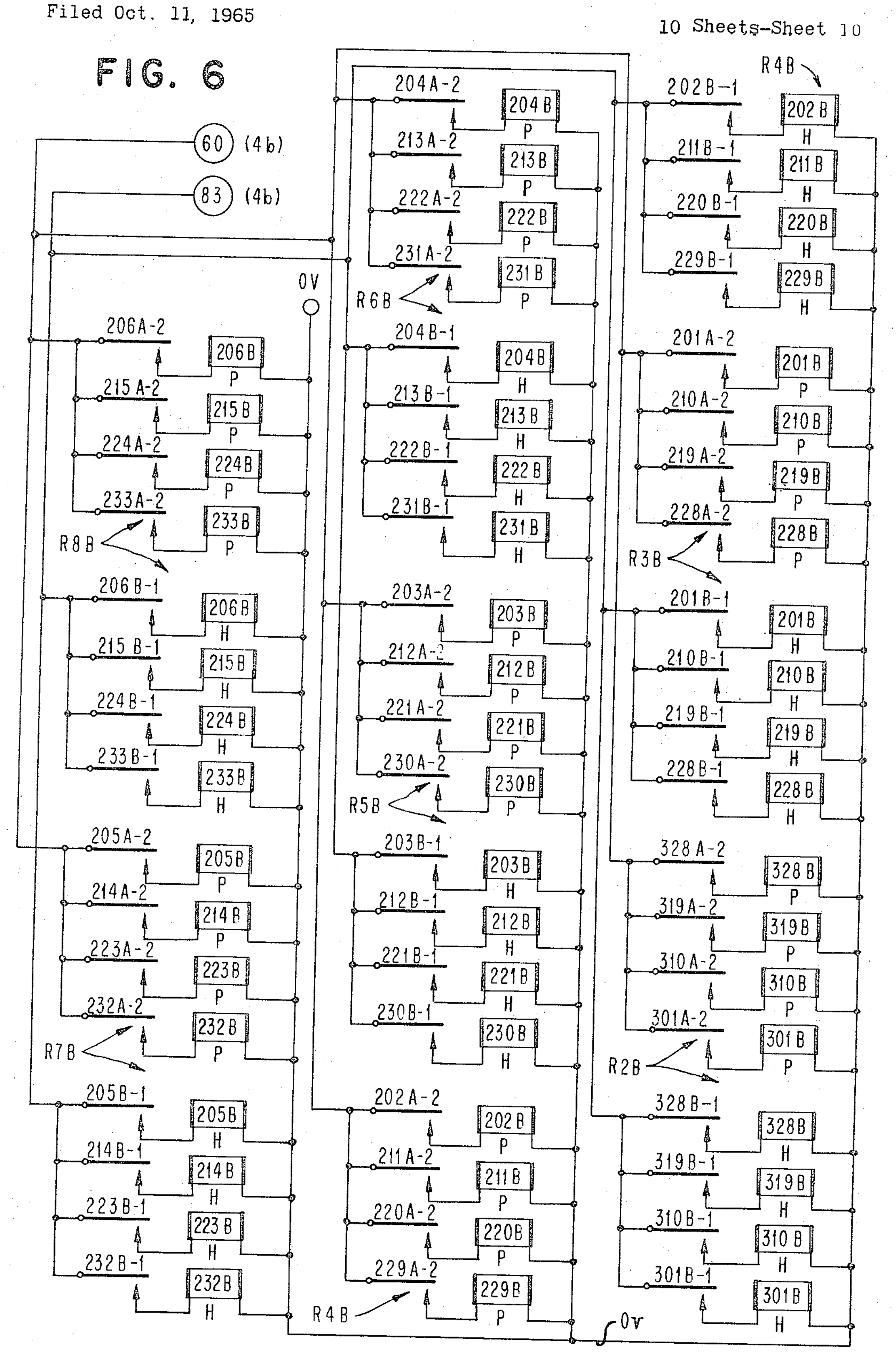

FIGS. *4a–4d* constitute, when placed top to bottom adjacent each other in descending alphabetical order, a schematic diagram of a portion of the wiring of the illustrative embodiment;

FIGS. *5a–5c* constitute a schematic diagram, when arranged as shown in FIG. *5d*, of another portion of the wiring; and FIG. 6 is a schematic diagram of the remaining portion of the wiring.

Referring now to the drawings, the invention is illustrated as embodied in a record card punch designed to punch holes in a conventional record card to represent letters, digits or special characters, each card being divided into eighty columns each containing twelve rows numbered from the top row to the bottom row in the following sequence: 12, 11, 0, 1, 2, 3, 4, 5, 6, 7, 8 and 9. The basic mechanical construction of the card punch is conventional and reference may be had to the aforementioned U.S. Patent 2,647,581, Gardinor et al. for details of construction.

Figures 1, 2:
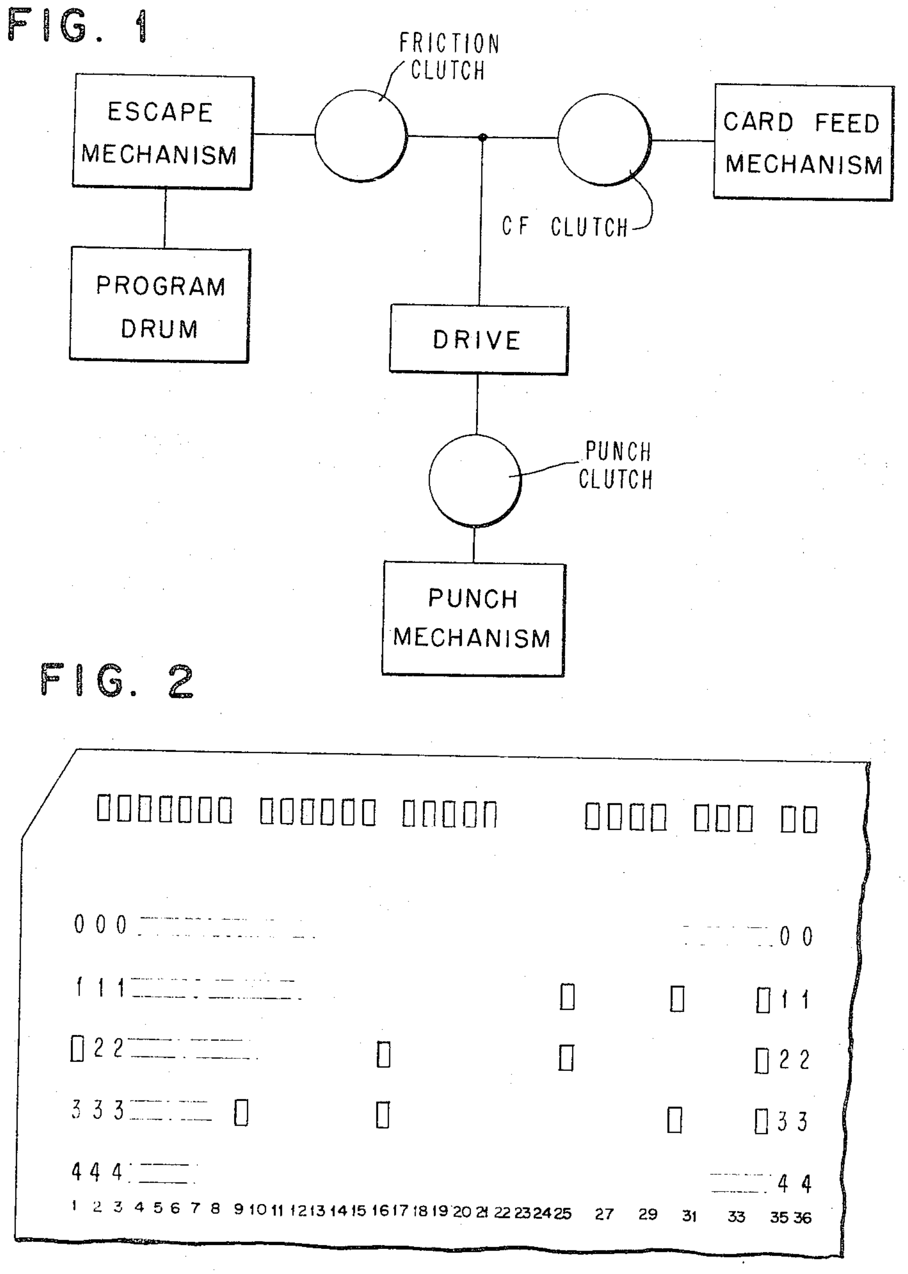
FIG. 1 is a block representation of the principal mechanical areas of a card punch embodying the invention.
FIG. 2 is a plan view of a programmed card illustrating one code for programming the length and position of left zero fields.

As illustrated by the block representations in FIG. 1, the card punch comprises a card feed mechanism which upon actuation of a CF (card feed) Clutch feeds, registers and stacks the cards in a conventional fashion. The CF Clutch actuated by a Drive which, when the card punch is in operation, runs continuously and is also used to actuate a Punch Mechanism and an Escape Mechanism through a Punch Clutch and a Friction Clutch respectively. The Escape Mechanism advances the cards through master and detail stations column-by-column. The Punch Mechanism, located at the detail station, punches the card in accordance with data keyed in by an operator or read from a preceding card at the master station. Included in the Escape Mechanism is a Program Drum adapted to have a program card mounted thereon which is punched to automatically control the size and position of any left zero fields. The Program Drum rotates in unison with movement of the cards through the stations.

The manner in which the CF Clutch is operated is well known and since the details thereof are unnecessary to an understanding of the invention, further description is not given. The Friction Clutch maintains a constant torque at the escape wheel and escapement is effected on energization of an Escape Magnet (FIG. *4a*) which momentarily disengages an armature from the escape wheel allowing it to rotate through an increment of one tooth corresponding to a one column escapement. The Punch Clutch includes an electromegnet 13 (FIG. *4a*) which, in response to energization thereof, allows the Punch Shaft of the Punch Mechanism to rotate through one revolution. The Punch Shaft has been modified relative to the prior art structure to include a plurality of cams P1–P7 that operate switches, in a manner described hereafter, to control portions of the left zero operation.

The card punch also includes a conventional numeric keyboard comprising twelve keys numbered corresponding to the rows of the cards being punched and a left zero key for initiating punchout during the left zero operations. The keys operate conventional latch contacts. The 11 key is also known as a dash key and is used, in left zero operations, where an 11 punch or hole is desired over the units position of a credit field. The keyboard interlocks or latches so that an operator can press only one key at a time, and the keyboard is restored, by operation of conventional Keyboard Restore Magnets, in order to proceed with keying data.

FIG. 2 illustrates the left zero program card coding for establishing the size and positions of left zero fields. The illustrated coding provides for left zero fields ranging in length from eight columns to three columns. The first column of a field is punched to define the field size and the remaining columns in the field are punched in the 12 row to provide field definition. More specifically, the control punches for programming left zero fields are listed in Table 1:

TABLE 1.—LEFT ZERO PROGRAM CARD CODING

| Field Size (No. of cols.) | Program | |
|---|---|---|
| | First Column | Remaining Columns |
| 8 | 2 | 12 |
| 7 | 3 | 12 |
| 6 | 2–3 | 12 |
| 5 | 1–2 | 12 |
| 4 | 1–3 | 12 |
| 3 | 1–2–3 | 12 |

As shown in FIG. 2, columns 22–24 are blank and thus do not define a left zero field so that the operator must key data or skip over these columns. The remaining illustrated columns are programmed in accordance with the table. Quite obviously, any specific program would be related to specific applications wherein the size and length of the left zero fields can be programmed according to the particular situation. Thus, a program card may contain only one left zero field up to eight columns in length or it may be completely filled with left zero fields or it may be a mixture of left zero and non-left zero fields. The program card actuates conventional starwheel sensors illustrated schematically in FIGS. 4*c* and 4*d*, the sensors including switches designated Starwheel 12, Starwheel 1, Starwheel 2 and Starwheel 3, wherein the numbers correspond to the rows in which the control holes are punched.

*Wiring*

For simplicity of illustration, the wiring of the card punch has been broken down into three portions represented by FIGS. 4*a*–4*d*, 5*a*–5*c* and 6. These portions are interconnected where the various connections are represented in the drawings by means of numbered circles wherein the connections are made between the figures through circles of like numbers, the parenthetical designation appearing next to the numbered circles representing the figure number in which the corresponding numbered circle can be found. The contacts shown in the drawings are illustrated in their normal positions. Escape interlock relay WCR–1 is a wire contact relay and the remaining relays are reed relays. Certain of the relays utilize both pick and hold coils designated in the drawings by the letters P and H, whereas the remaining relays utilize only a pick coil for both the pick and hold functions and these coils are not designated by either a P or H. The various relays and magnets are preferably operated by the same voltage, for example, a positive 48 volt power supply, the coils and electromagnets being connected between the plus 48 volt and a zero volt power line as shown in the drawings.

*Manual punching operation*

For the purpose of illustrating the invention, the operation of the card punch is described below with reference to manual punching of numerical data and automatic left zero operations. It is to be understood though that in practice other operations such as punching alphabetic data or special characters, skipping, duplicating, etc. would be incorporated into the machine. In manual punching, when a numerical key is pressed, the broad objectives of the card punch are to escape the card being punched one column, to punch the card with the appropriate data depending upon which key was pressed, and to restore the keyboard for further punching.

Figure 3:
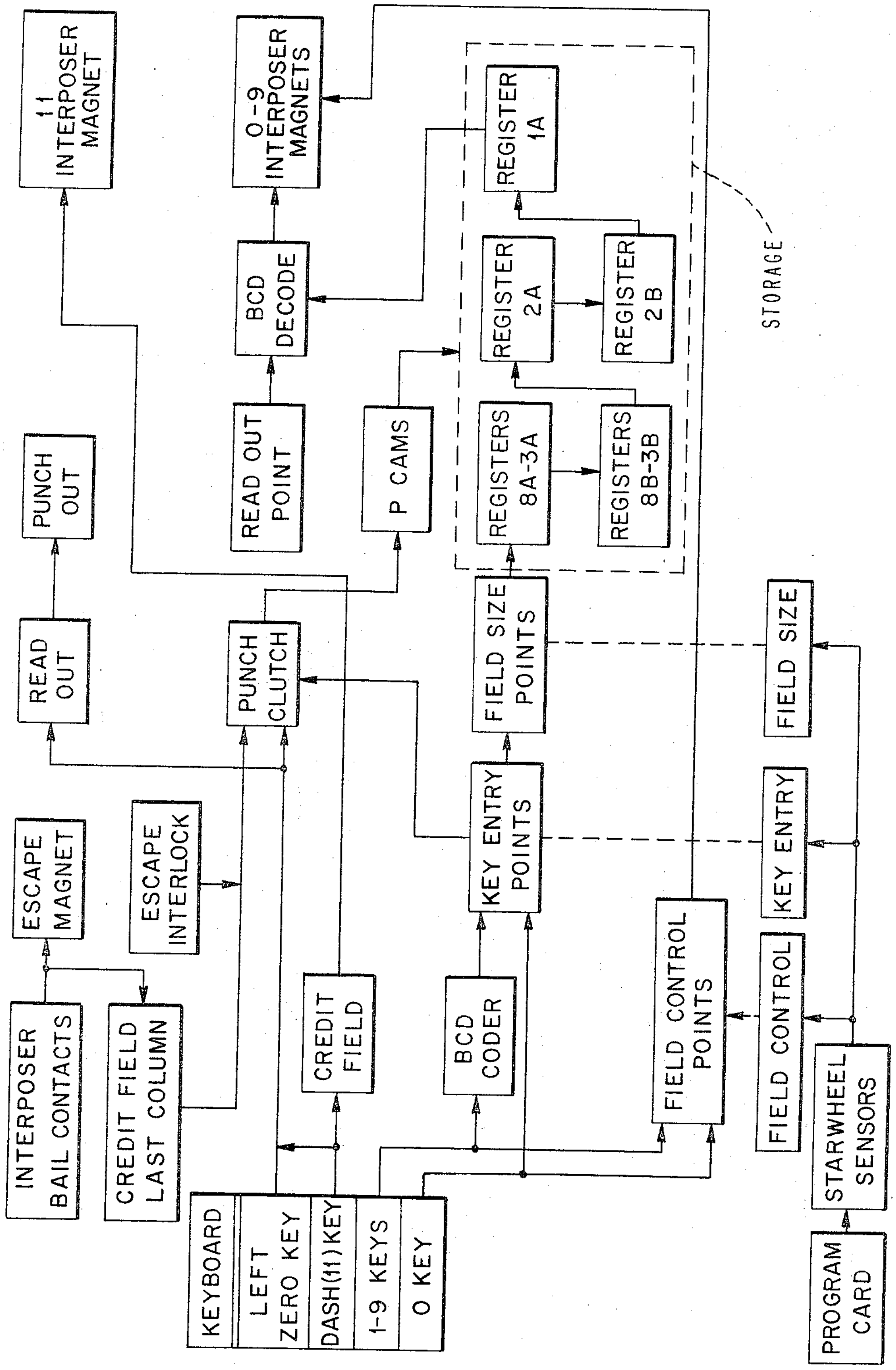
FIG. 3 is an operational block diagram containing an understanding of the invention.
Figure 4A:
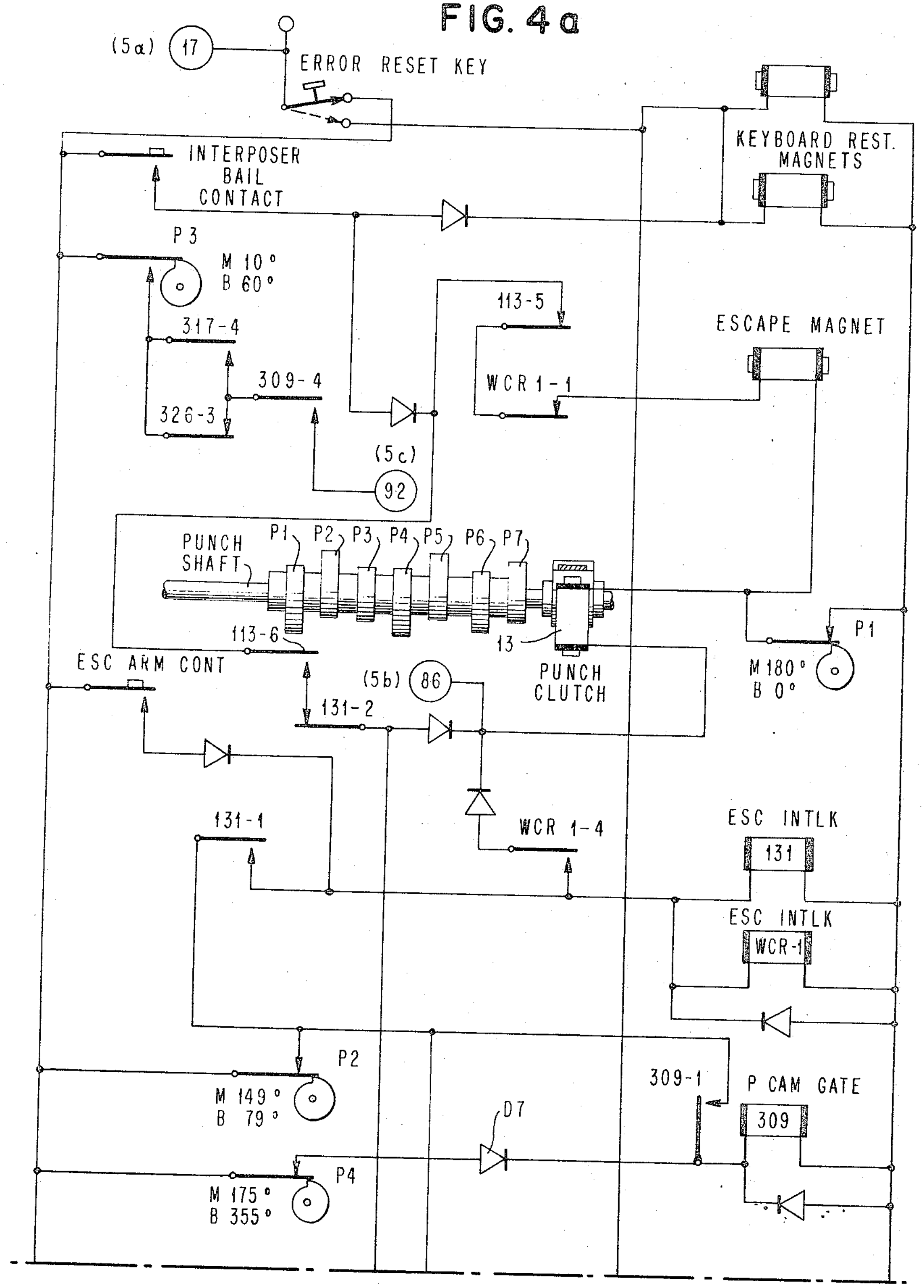
Figure 4B:
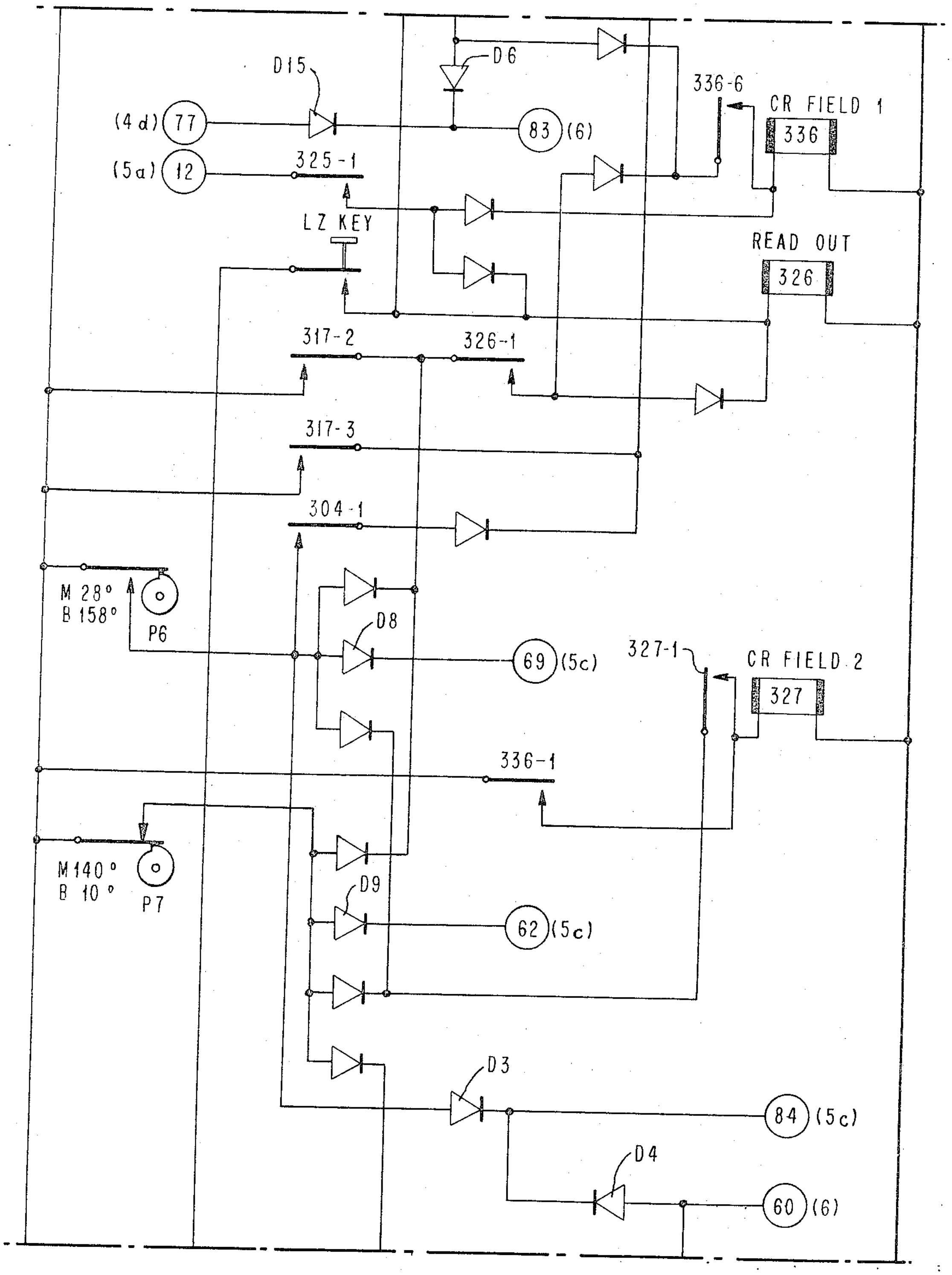
Figure 4C:
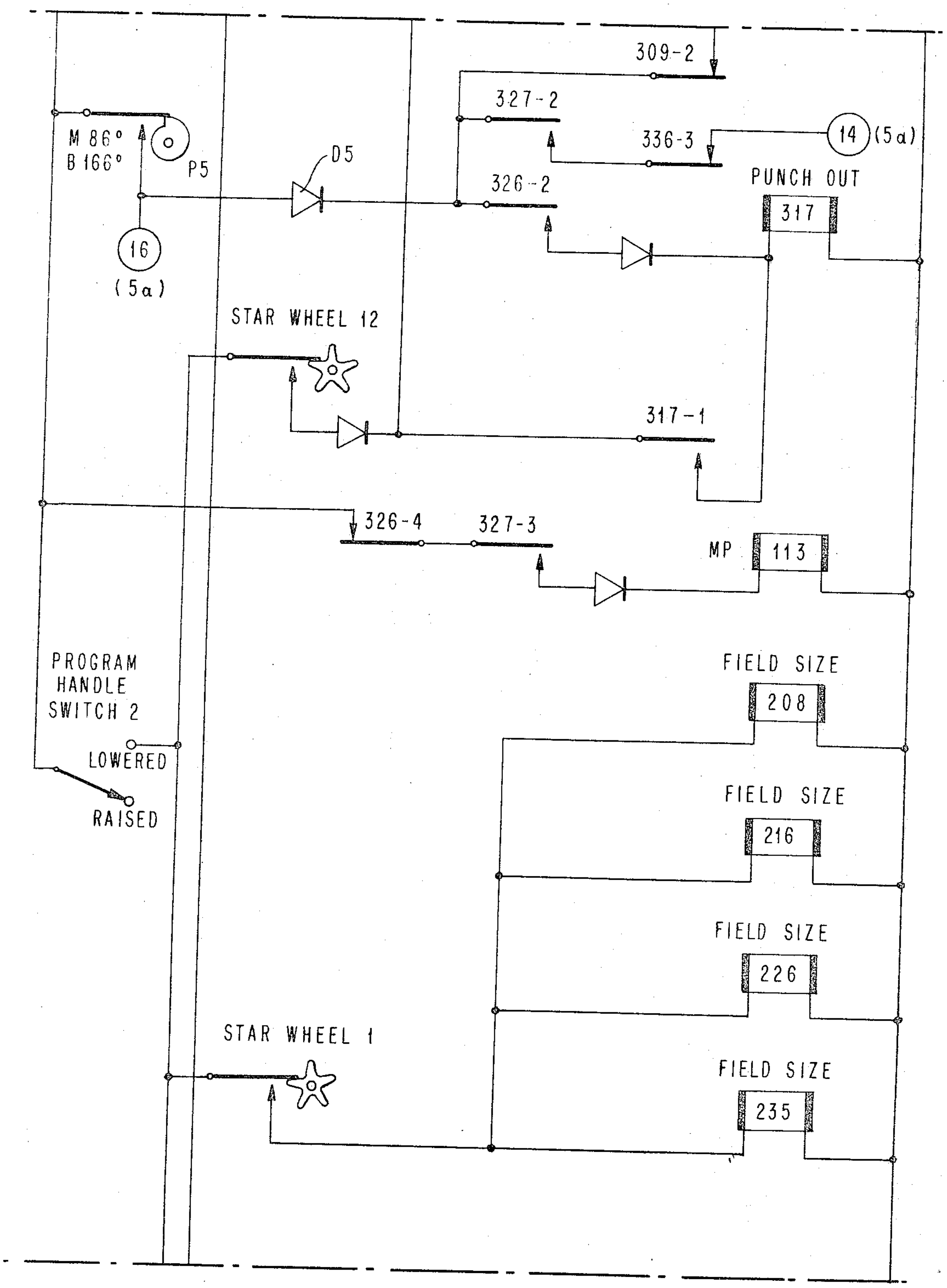
Figure 4D:
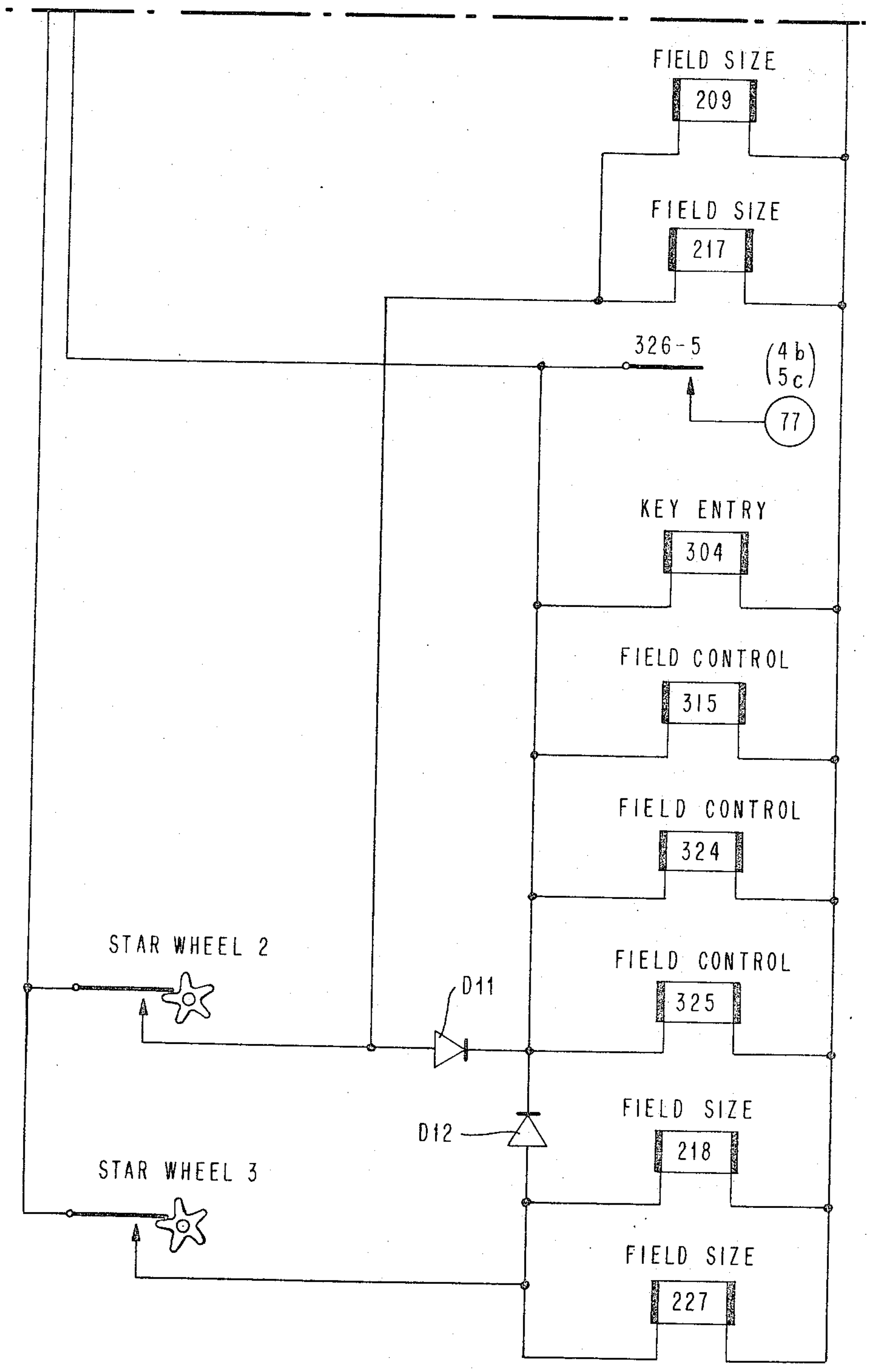
Figure 5A:
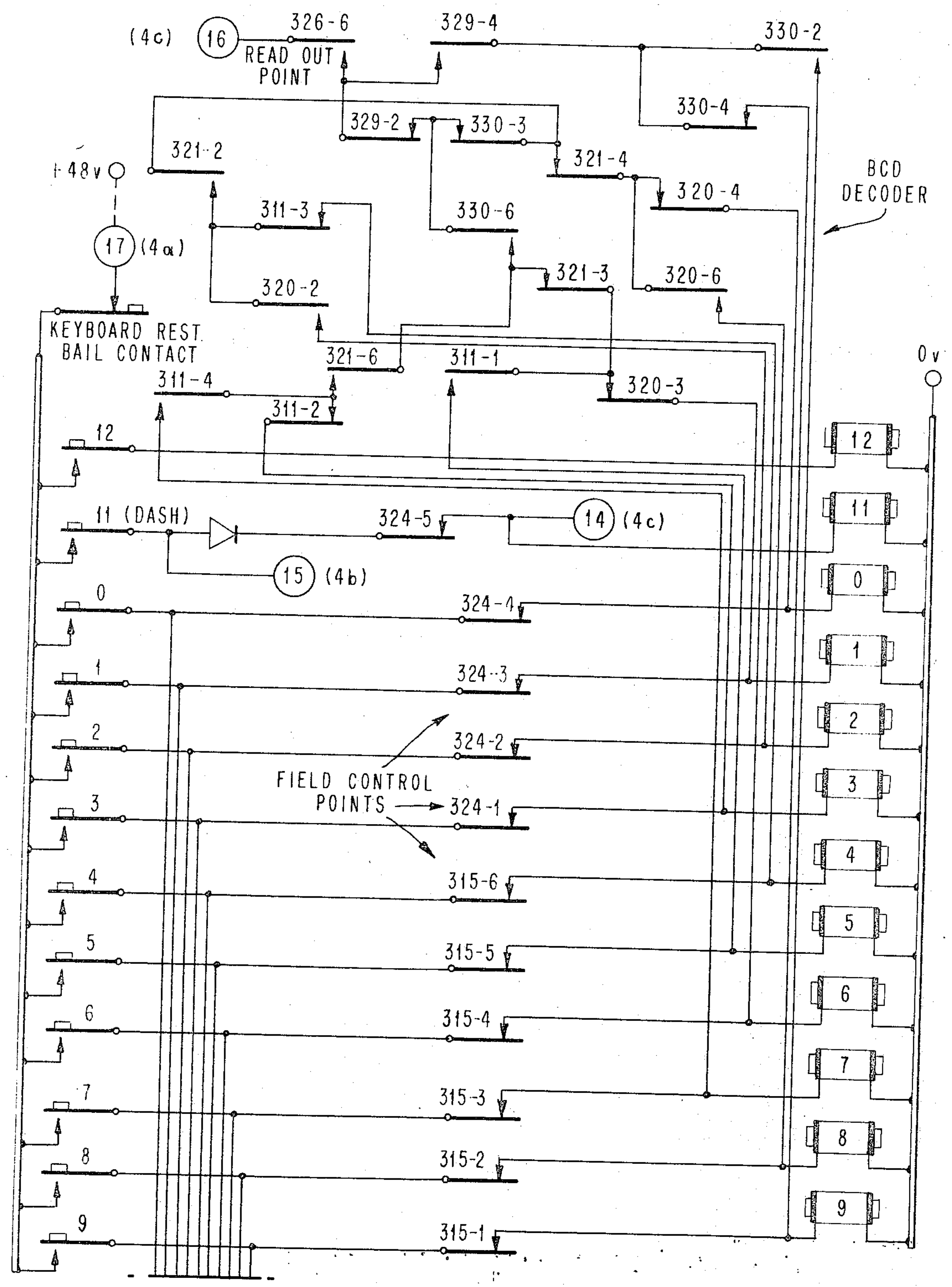

More specifically, and with reference to FIGS. 3, 4*a* and 5*a*, the numerical keys 0–9 are connected through a Keyboard Restore Bail Contact to the power supply. When a numerical key is actuated to close the latch contacts associated therewith, current flows through the normally closed associated field control point to energize the appropriate interposer magnet. For example, when the 3 key is pressed so as to close the associated contacts, current flows through contacts 324–1 and energizes Interposer Magnet 3. Energization of any of the interposer magnets closes a conventional Interposer Bail Contact to energize the Keyboard Restore Magnets. This causes the Keyboard Restore Bail Contact to open and thereby deenergize any energized interposer magnet and prevent further operation of the keys from energizing additional interposer magnets. The closing of the Interposer Bail Contact, through normally closed contacts WCR1–1 and cam contacts P1, energizes the Escape Magnet causing it to attract a conventional escape armature (not shown) to allow the escape mechanism to advance the card being punched one column, and it also closes an escape armature contact ESC ARM CONT to energize escape interlock relays 131 and WCR–1. Thereupon, contacts WCR1–4 close to energize the punch clutch magnet 13, through closed contacts P1, and contacts WCR1–1 open to deenergize the Escape Magnet. Once the Punch Clutch is actuated, the Punch Shaft rotates through one revolution. When at rest, the punch shaft is positioned at a reference angle of 345° and it rotates from this position through 360° or one revolution. Cam contacts P1 break as the punch shaft rotates through 0° and make as it rotates through 180°. The make and break timing of the other cam contacts is labeled in the drawings. When contacts P1 open, punch clutch magnet 13 is deenergized. Rotation of the punch shaft actuates the punch associated with the interposer magnet that was energized to initiate the punching operation. After the card has been punched, the Interposer Bail Contact opens to deenergize the Keyboard Restore Magnets and thereby close the Keyboard Restore Bail Contact to allow further punching. When escape interlock relay 131 is energized, contacts 131–1 close and establish a hold circuit through cam contacts P2 for the escape interlock relays, this hold circuit being broken when cam contacts P2 break at 79°. As previously indicated, during such holding action, the punch clutch magnet 13 is deenergized as a result of the breaking of cam contacts P1.

*Automatic left zero operations*

The purpose of the automatic left zero feature is to fill left zero fields in a card by punching the appropriate number of 0 holes to the left of the significant digits when the number of significant digits is insufficient to fill a field. To accomplish this, the operator need only first key in the significant digits and then press the Left Zero Key to initiate punchout of an ordinary left zero field or press the 11 key to initiate punchout of a credit field. The punchout of a credit field is similar to that of a left zero field except that an 11 hole is punched over the units digit position of the field.

Automatic left zero operations are controlled by programming. A program card is punched according to the previously described code to define the position length of each left zero field. The program card is mounted on the Program Drum, in conventional fashion, and the program handle is lowered to bring the starwheel sensors into contact with the card. The lowering of the handle also closes contacts SW2 (FIG. 4*c*) to place or condition the starwheel switches for operation. When a field is not programmed for left zero operations, manual punching may be carried out as described above. When the program card defines a left zero field, the left zero operations may be classed as a read-in operation, an error reset operation and a read-out, punch-out operation.

The closing of either contacts Starwheel 2 or Starwheel 3 picks key entry relay 304 and field control relays 315, 324 and 325. The key entry points are normally open and, during manual punching, prevent the flow of data into storage and preclude operation of the punch clutch without first escaping. During automatic left zero operations, key entry points 304–3 through 304–6 connect the output lines of a BCD Coder to the input lines of the field size points. These key entry points along with point 304–2 are connected through the five diodes D2 at the bottom of FIG. 5*b* and connection 86 to energize the punch clutch magnet 13 (FIG. 4*a*) each time one of the digit keys is pressed, in a manner more fully pointed out hereafter.

The points of field control relays 315 and 324 are connected, as shown in FIG. 5*a*, in the circuit between the digit keys and key 11 and the Interposer Magnets. These points are normally closed and connect the keys to the Interposer Magnets for direct actuation thereof during manual punching. During the automatic left zero operations, when the Field Control relays are energized, the field control points open to prevent direct operation of the Interposer Magnets and to cause data to flow into storage. Field control points 325–1 (FIG. 4*b*) are normally open and provide a connection from the 11 key to a credit field 1 relay 336 and to read-out relay 326 whereby operation of the 11 key picks these relays. The Field Size Points (FIG. 5*b*) form a switching network that connects the BCD Coder to the register through which data is entered into storage. Starwheels 1, 2 and 3 are arranged to pick the Field Size Relays 235, 226, 216, 208, 209, 217, 218 and 227 in response to the program card coding to thereby close the appropriate Field Size Points and direct data to the proper register.

Figures 5B, 5D:
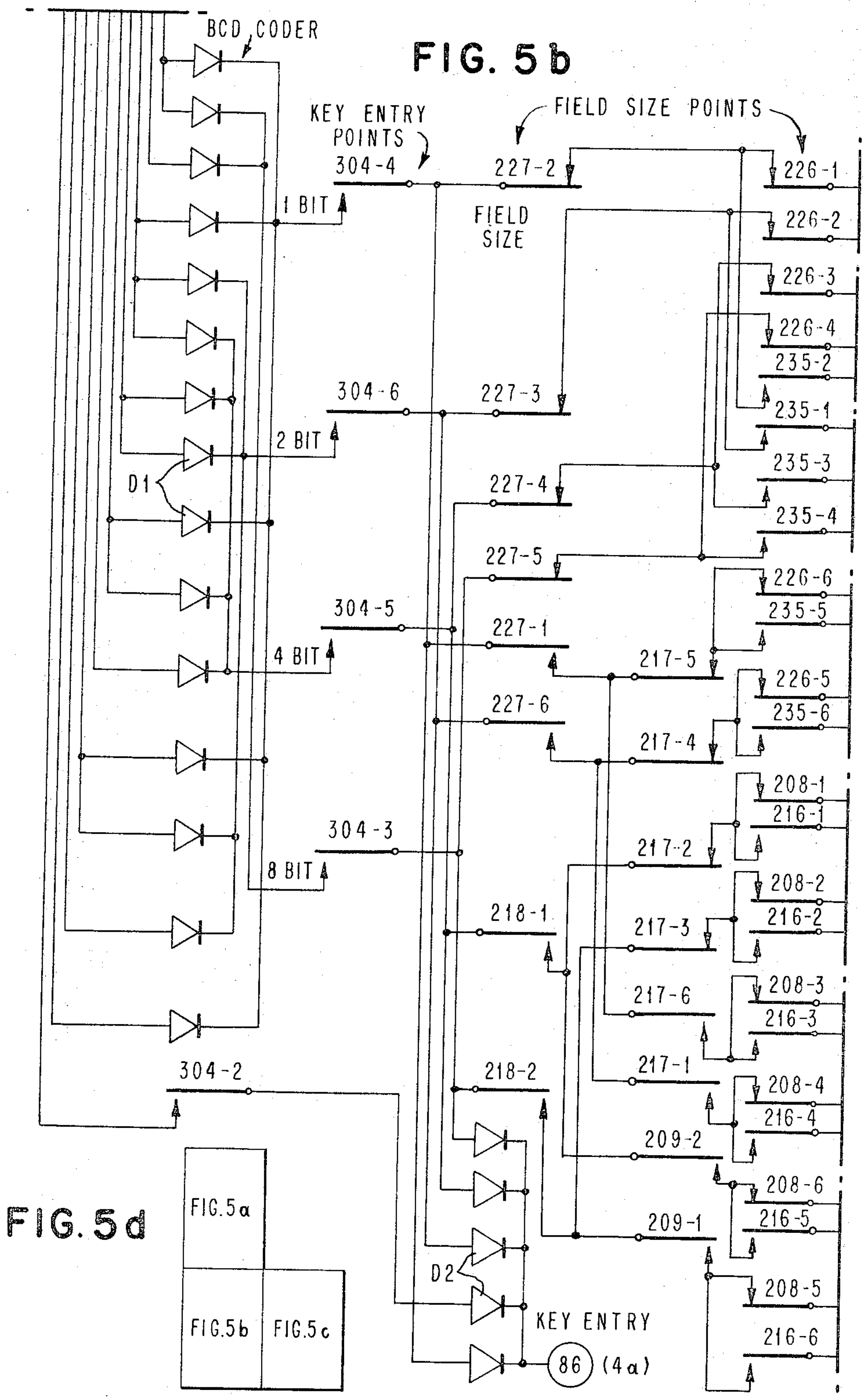
Figure 5C:
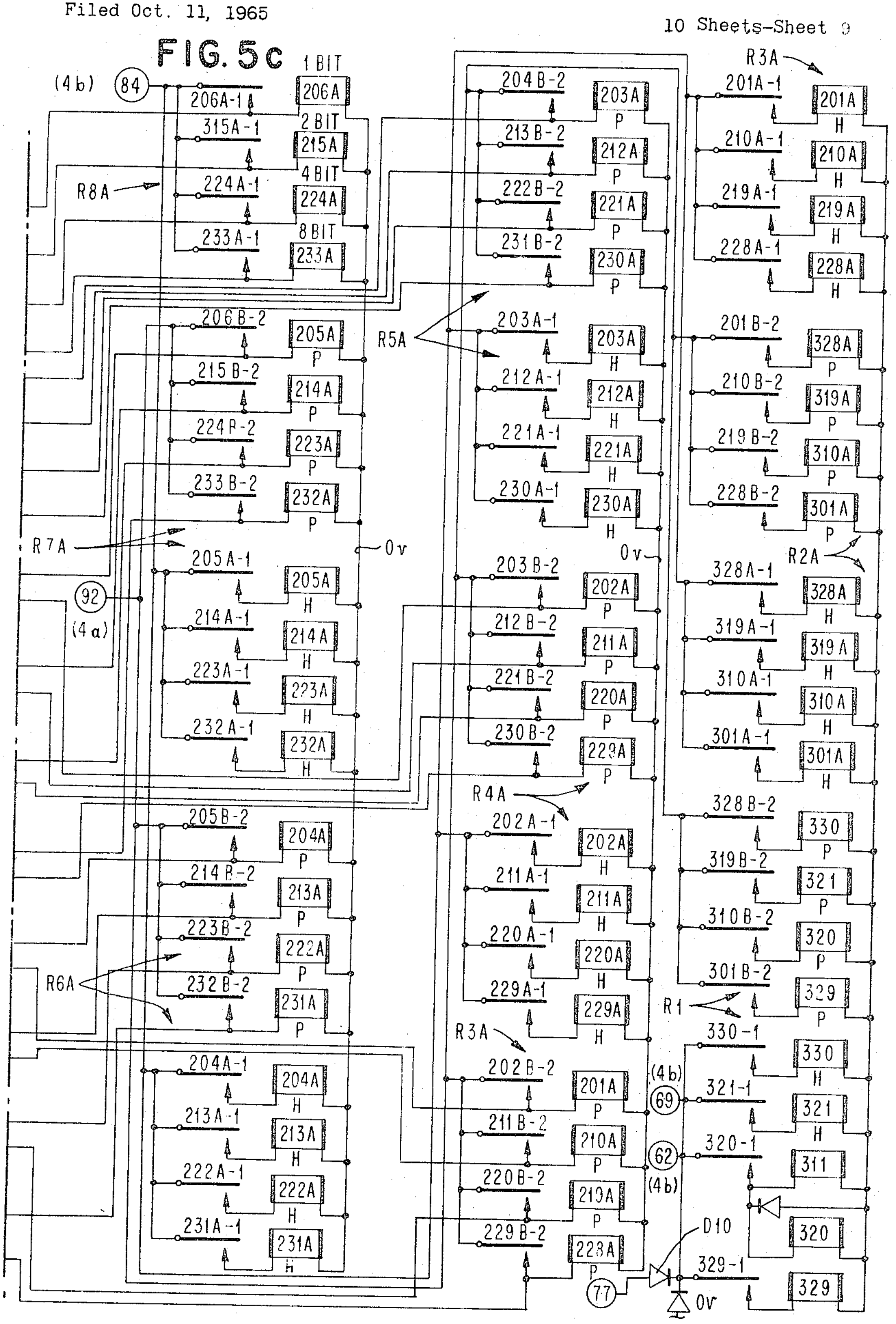

As shown in FIG. 5*b*, the BCD Coder comprises fifteen diodes D1 arranged as shown for converting the decimal inputs caused by actuation of the digit keys 1–9 into a binary coded decimal BCD output in accordance with Table 2:

TABLE 3

| Register | Relays | | | |
|---|---|---|---|---|
| | 1-bit | 2-bit | 4-bit | 8-bit |
| R8A | 206A | 215A | 224A | 233A |
| R8B | 206B | 215B | 224B | 233B |
| R7A | 205A | 214A | 223A | 232A |
| R7B | 205B | 214B | 223B | 232B |
| R6A | 204A | 213A | 222A | 231A |
| R6B | 204B | 213B | 222B | 231B |
| R5A | 203A | 212A | 221A | 230A |
| R5B | 203B | 212B | 221B | 230B |
| R4A | 202A | 211A | 220A | 229A |
| R4B | 202B | 211B | 220B | 229B |
| R3A | 201A | 210A | 219A | 228A |
| R3B | 201B | 210B | 219B | 228B |
| R2A | 328A | 319A | 310A | 301A |
| R2B | 328B | 319B | 310B | 301B |
| R1 | 330 | 321 | 320 and 311 | 329 |

Data is entered into storage through the A portions registers R8–R3 according to the length of the left zero field for which the field size points are set. For example, in a seven column left zero field, data enters storage through R7A. To accomplish this, the field size points are arranged as shown to connect the output lines of the BCD Coder to the particular A register through which the data is being entered wherein the 8-bit output line of the coder is connected to the relay representing the 8-bit, the 4-bit output line being connected to the relay representing the 4-bit, etc. Data is entered into storage in response to depression of a key on the keyboard, and, when any of the digt keys 1–9 are pressed, the relays of the A register through which the data is being entered into storage are actuated according to the BCD value thereof. The actuation of one of the keys also energizes the punch clutch magnet 13 causing the Punch Shaft to rotate through one revolution and the cams thereon cause the data to be transferred within storage in the manner set forth below. During read-in, a digit enters a high numbered register and is transferred down through successive lowered numbered registers until all of the significant digits have been keyed in. Thereupon the data is read

TABLE 2.—BCD CODE

| Decimal | 1 | 2 | 3 | 4 | 5 | 6 | 7 | 8 | 9 |
|---|---|---|---|---|---|---|---|---|---|
| BCD Bits | 1 | 2 | 1–2 | 4 | 1–4 | 2–4 | 1–2–4 | 8 | 1–8 |

The BCD Coder has four output lines connected to key entry points 304–3 through 304–6. Current flowing through these output lines represents a 1 bit, a 2 bit, a 4 bit or an 8 bit, as shown according to the BCD code. Storage comprises eight registers, there being one register for each column of the maximum length of a left zero field that can be programmed. Obviously, the number of registers can be more or less. In each left zero field, only the number of registers corresponding to the length of field are used. One register is designated R1 and the remaining seven registers are divided into A portions and B portions, designated R8A and R8B through R2A and R2B.

In storage, data is stored or transferred in BCD form according to which relays are picked, a blank register representing the digit 0. With reference to R8A in FIG. 5*c*, when the relays thereof are picked, upper relay 206A represents a 1 bit, the next lower relay 215A a 2 bit, the next lower relay 224A a 4 bit, and the lowest relay 233A an 8 bit. The remaining registers are coded similarly. Register 1 contains an additional relay 311 which, in conjunction with relay 320, represents a 4 bit. The registers and relays are arranged to represent the BCD bits as shown in Table 3.

out from storage by continuing the transfer of data down through the lowered numbered registers until all of the data has entered register R1 which controls, through the BCD decoder, operation of the interposer magnets during punchout.

The operator can key any number of significant digits. If the operator keys more digits than a field will hold, the first digits keyed will be lost (added or jumbled). If the wrong number is keyed or more digits than required are entered, the operator can correct the error by clearing the field in response to actuation of the Error Reset Key (FIG. 4*a*).

Data enters storage through the A section of the register having a number corresponding to the field length and flows serially through the succeeding lowered number registers for eventual read-out from R1. After a digit enters the appropriate A section, it is stored in the corresponding B section, transferred to the succeeding A section, stored in the succeeding B section, and so on until it reaches R1 for read-out. An operator keys the digits of a number in the normal order in which they are read from left to right (higher order digits to units digit). As previously indicated, a zero is represented by a blank condition. Thus, when an operator has finished keying in the significant digits, those lower numbered registers, if any, to which a digit has not been transferred represent left zeros. Data enters R8A from only the keyboard. Data enters R7A–R3A from either the keyboard or from the B sections of the preceding (higher numbered) registers. Data enters R2A and R1 from only the preceding B sections. Data is stored in and flows through the registers under the control of P cam contacts P2–P7.

In R8A, each relay has a hold point (e.g. hold point 206A–1 of relay 206A) connected to it, each hold point being also connected through connections 84 to P6 via D3 and P5 via D4, 309–2 and D5. When one of the 1–9 digit keys is pressed, the correct relays of R8A are picked and the punch clutch is actuated. The picked relay (or relays) is at first held through the latch contacts associated with each key. When P6 closes at 28°, the Keyboard Restore Magnets are energized and the picked relay is then held through P6. P5 makes at 86° and holds the relay until P5 breaks, P6 having broken prior thereto.

Each relay of R8A also has a pick contact connected to the pick coil of corresponding relay of R8B, each pick contact being connected through connection 60, point 309–2 and D5 to P5. Thus each relay of R8B, corresponding to each relay of R8A that has been picked, is picked when P5 makes. Each relay of R8B has a hold contact connected to the hold coil thereof and to P2 via connections 83 and D6. As the punch shaft rotates, P2, makes at 149° of one cycle and breaks at 79° of the next. Thus, when P2 makes, each picked B section relay is held until 79° of the next cycle, and the data is accordingly stored awaiting transfer to the succeeding register.

Each relay of R8B also has a pick point connected to the pick coil of the corersponding relay of R7A, each such point being connected to P3 through connection 92, points 309–4 and 326–3. Thus, in the cycle after the one in which the data is initially stored in R8B, P3 makes at 10°, to pick the correct relays and transfer the data from R8B to R7A, and breaks at 60° to clear R8B. The relays of R7A have hold points connected to their own hold coils and to P6 whereby once P6 makes at 28°, the flow of data into R7B under the control of P6, P5 and P2 is stimilar to that described above with reference to the flow of data into R8B. Each of the remaining A and B sections is constructed and operated in a similar manner to receive, store and transfer data.

In each of R7A–R3A, the relays are also connected to the Field Size Points so that data can be entered into the appropriate register dependent on the field length. Thus, operation of a key picks the correct relays and energizes the punch clutch so that data enters into the register, once P6 makes, the same as if it had been transferred thereto from the preceding B section.

R1 comprises relays 330, 321, 320 and 329 having pick coils connected to the pick points of the relays of R2B and to P3 so that data is transferred thereto as it is with the other registers. The hold coils of relays 330, 321, 320 and 329 are connected through hold points of such relays to P6 via connection 69 and D8, to P7 via connection 62 and D9 to Starwheel 2 through D10, connection 77, points 326–5 and D–11 and to Starwheel 3 through D–10, connection 77, points 326–5 and D–12. Relay 311 is connected in parallel with the hold coil of 320 and is picked when 320–1 closes and 320 is held. Thus, during read-in, the data is stored in R1 and held by Starwheels 2 or 3, whereas P7 holds the data during punch-out when Starwheels 2 and 3 are open.

If the 0 key is pressed, the Punch Clutch is energized and the Punch Shaft rotates through one cycle, as before, but none of the register relays through which data is being entered is picked, in order to represent a zero. This blank condition, or zero representation, is stored and transferred through the registers the same as representations of the digits 1–9.

*Error reset operations.*—At any time prior to read-out, punch-out, an error can be corrected by pressing the Error Reset Key and then keying the correct data. When the key is actuated, P cam and the starwheel contacts are disconnected momentarily from the power supply and the Keyboard Restore Magnets are energized. Consequently, the Keyboard Restore Bail Contact opens to disconnect the keys from the power and any picked register relay is dropped, to clear the registers. When the Error Reset Key is released, the machine reverts to a condition for receiving the correct data.

*Read-out, punch-out operations.*—After the significant digits have been keyed, the operator initiates read-out and punch-out by pressing the LZ key or the 11 or dash key to pick read-out relay 326 and to energize the Punch Clutch.

The R1 relays 330, 321, 311, 320 and 329 have points arranged as shown in FIG. *5a* to form a BCD Decoder on decode tree for energizing the Interposer Magnets 0–9 in accordance with the data stored in R1 under the control of read-out point 326–6 and P5. Thus, when read-out relay 326 picks and 326–6 closes, the interposer magnets are controlled by P5. During the time P5 is made, the information in R1 is read into the Interposer Magnets. The left zero punch-out operation is similar to prior art automatic duplicating operations in that the first punch cycle is a dummy cycle wherein the information is read and is mechanically stored in the punch unit. The second punch cycle punches the thus-stored information and allows additional information to be read into the Interposer Magnets for punching during the next cycle.

To prevent the transfer of information from the registers when P3 closes at 10° during the dummy cycle, point 326–3 opens upon picking read-out relay 326. Furthermore, to hold the information in the registers during the dummy cycle so as not to lose it when P2 opens, point 326–5 is closed to establish a hold circuit through Starwheel 2 and connection 77, to the hold coils of the B sections through diode D15 and connection 83 and to R1A, until P2 makes at 149°.

When P5 makes at 86°, the appropriate Interposer Magnet is energized under the control of R1 and the Decoder to allow the interposer to unlatch from its armature to thereby mechanically store the information. On the next cycle, the mechanically stored information will be punched. When P5 makes, punch-out relay 317 is picked through now-closed points 326–2, and points 317–1 close to prepare a hold circuit through Starwheel 12, points 317–2 close to hold relay 326, points 317–5 close to hold the Keyboard Restore Magnets and points 317–4 close to restore P3 so as to transfer data during subsequent cycles.

When an Interposer Magnet is energized, the Interposer Bail Contact closes so that when P1 makes at 180°, the escape magnet is energized allowing the detail card to escape one column. During such escapement, the program card also escapes one column causing Starwheel 12 to close and hold relay 317 (and relay 326) and Starwheels 2 or 3 open to drop the field control, key entry and field size relays. Starwheels 2 and 3 open after P2 makes to retain the information in the register for transfer during the next cycle.

During the dummy cycle, P7 makes at 140° and provides a continuing hold for R1 until 10° of the next cycle. The Keyboard Restore Magnets are energized by P6 at 28° and are held through 317–5 for the rest of the left zero field. The ESC ARM CONT closes when the escape magnet is energized to pick relays 171 and WCR–1 whereupon the Punch Clutch is actuated for the next cycle.

During the second and subsequent cycles, the information in the registers is transferred through the registers and stored therein under the control of the P cams in the same manner as during read-in, and the data in R1 is read into the Interposer Magnets during P5 time, as in the dummy cycle. At the start of each subsequent cycle, the interposer, which was unlatched to thereby store data, latches on the punch bail when the punch bail is at its highest point of travel. Once an interposer is unlatched, it must hook on the punch bail in order to be restored to its armature. As the Punch Shaft rotates, the detail card is punched, in conventional maner. If the same hole is to be punched in adjacent columns, the appropriate Interposer Magnet is energized during P5 time so that the interposer fails to be restored to its armature but remains latched to the punch bail so as to mechanically store the data. After the detail card is punched, P1 makes at 180° energizing the Escape Magnet causing the card to escape to the next column. Thus, in the cycles after the dummy cycle, new information is transferred to R1 when P3 makes and it is read into the Interposer Magnets when P5 makes, while the digit previously read into the interposers is punched. The card then escapes to the next column.

When the final digit has been transferred into R1 and read into the Interposer Magnets at P5 time, the detail card escapes to the last column of the left zero field being punched. During such escapement, Starwheel 12 opens to transfer control for holding relay 317 to P7. When P5 breaks, during this, the next to last cycle, all digits that were keyed into storage have been read out so all registers represent zero and have no relays picked. In the last cycle, the last digit read into the Interposer Magnets is punched as before. At 10°, P7 breaks, and relays 317 and 326 drop. Point 317–5 thus opens the circuit to the Keyboard Restore Magnets which are then held until about 65° by the Interposer Bail Contact. The last digit is punched and the punch clutch latches at 345° to complete the punch-out.

If the operator presses the LZ key without having keyed any significant digits, zeros would be punched to completely fill the field, and the machine would operate as just described except that no significant digits would be transferred through storage.

*Credit field read-out, punch-out operations.*—This operation is initiated by pressing the 11 key, instead of the LZ key, and is similar to the above described LZ Read-Out, Punch Out except that an extra cycle, similar to a conventional multipunch cycle, is taken at the end to punch an 11 hole in the units column of the LZ field. When the 11 key is pressed, a circuit is closed through connection 15 and points 325–1 that picks read out relay 326 and a Credit Feld 1 relay 336, the picking of relay 326 being operative to initiate reading and punching as during LZ read-out, punch-out. When relay 336 picks, points 336–1 close to pick a Credit-Field 2 relay 327, and points 336–6 close to establish hold circuit through 326–1 and 317–2 and through P2. When relay 327 picks, points 327–1 close to establish a hold circuit through P7 in parallel with one through 336–1. The read-out, punch-out proceeds, once it is initiated, as during LZ read-out, punch-out until the last two cycles.

During the next to the last cycle, which corresponds to the last cycle of the LZ read-out, punch-out, when P7 breaks at 10°, relays 317 and 326 drop as before and relay 336 is held through 336–6 until P2 opens at 79°. When 326 drops, 326–4 closes and a multiple punch relay MP 113 is picked, through now closed 327–3, to open 113–5 and prevent emergization of the Escape Magnet when the 11 Interposer Magnet is energized. When P5 makes at 86°, a circuit is completed through points 327–2 and 336–3 and connection 14 to energize the 11 Interposer Magnet. Then, the Interposer Bail Contact closes and the Punch Clutch, through points 113–6 and 131–2, is actuated when P1 makes.

In the last cycle, P7 breaks at 10° to drop relay 327. Relay 113 is dropped when 327–3 opens. The 11 hole is punched. Finally, the Punch Clutch latches at 345° to complete the operation.

While the invention has been particularly shown and described with reference to a preferred embodiment thereof, it will be understood by those skilled in the art that various changes in form and details may be made therein without departing from the spirit and scope of the invention.

What is claimed is:

1. In a data recording machine having recording means for recording data in fields on a record, and a keyboard having numeric keys by means of which numeric data is entered into said machine, the combination of:

a plurality of storage devices having orders corresponding to the orders of a left zero field, said devices being in a series ranging from a low order device to a high order device and having at least one intermediate order device therebetween;

a left zero key;

first means operatively connected for serially entering significant digits into said low order device in response to operation of said numeric keys and transferring such digits into higher order devices;

and second means responsive to operation of said left zero key for serially reading said digits from said high order device and operating said recording means in accordance therewith.

2. In a data recording machine having recording means for recording data in fields on a record, and a keyboard having numeric keys by means of which numeric data is entered into said machine, the combination of:

a plurality of storage devices having orders corresponding to the orders of a left zero field, said devices being in a series ranging from a low order device to a high order device;

first means for entering a digit in said low order device in response to each actuation of a numeric key;

cyclic means operative to transfer each digit entered into said low order device through successive higher order devices;

second means for actuating said cyclic means in response to each actuation of a numeric key whereby said devices are set, at the end of keying, to represent the significant digits and the left zeros, if any, to be recorded;

and means for synchronously operating said cyclic means and said recording means to read out data from said high order device by transferring the left zeros and significant digits into said high order device and to record the left zero field in accordance with the digits read from said high order device.

3. In a recording machine, recording means, means to advance a record by said recording means for recording data thereon, a keyboard having numeric keys and a left zero key, program means defining the positions and lengths of left zero fields, storage comprising a series of registers corresponding in number to the number of columns in the maximum size left zero field in which left zeros are to be automatically recorded, control means responsive to said program means for connecting said keyboard to said storage whereby operation of said numeric keys enter data into storage through an entry register so that only those registers corresponding to the length of the left zero field being recorded are used, cyclic means operated in response to actuation of a numeric key to store each digit as it is keyed in said entry register and to transfer each digit previously stored into a succeeding register, said registers normally representing zero, means responsive to actuation of said left zero key to initiate a read-out and recording of data stored in said storage, and means responsive to said program means to continue read-out and recording until all data in said storage has been recorded, said cyclic means being further operable during said read-out and recording to transfer stored digits, including left zeros, through said series of registers for read-out from a single one thereof.

4. In a card punch having a punch mechanism including a rotary punch shaft and a plurality of selectively operated interposer magnets, an escapement mechanism for advancing a card past said punch mechanism, and a keyboard, the combination of:

at least three registers including an entry register, an intermediate register and a read-out register;

a first means responsive to operation of said keyboard for reading data serially into said entry register;
second means responsive to operation of said keyboard and said punch shaft for serially transferring and storing data in said registers;
a punch-out key;
and third means actuated in response to operation of said punch-out key and operative to read data from said read-out register and to transfer additional data to said read-out register for read-out therefrom, whereby said data are read into said punch mechanism for controlling operating thereof.

5. The combination of claim 4 comprising:
means responsive to operation of said punch-out key to punch a hole over the units digit position of a left zero field to signify a credit field.

6. In a data recording machine having means for recording numerical data on a card and a keyboard having numeric keys, the combination of:
program means defining the position and length of a left zero field;
storage;
switch means controlled by said program means and operative to connect said keyboard to said recording means for manual recording and to connect keyboard to said storage for left zero recording;
said storage comprising a plurality of registers having orders corresponding to the orders of the left zero field, said storage including an entry register for receiving significant digits from said keyboard and a read-out register for recieving those left zeros and significant digits to be recorded;
means connecting said read-out register to said recording means for operating said recording means in accordance with data read from said register;
a left zero key;
and means responsive to operation of said left zero key for operating said recording means and said storage to read all the digits in storage from said read-out register in serial fashion and to operate said recording means in accordance therewith.

7. In a card punch having a punch mechanism including a rotary punch shaft, a punch clutch operative in response to actuation thereof to rotate said shaft through one revolution and a plurality of interposer magnets for selectively operating said punch mechanism to punch data in a detail card, and an escapement mechanism for advancing said detail card past said punch mechanism, the combination of:
a keyboard having numeric keys and a left zero key;
program means moved in synchronism with movement of said detail card by said escapement mechanism and defining the lengths and positions of left zero fields to be punched in said detail card;
storage means comprising a plurality of registers corresponding in number to the number of columns in the maximum size left zero field to be punched, said registers being connected in a series that terminates in a read-out register from which data entered into storage is read, said registers normally representing zero;
field size switch means responsive to said program means for connecting said keyboard to one of said registers, when said detail card is at a left zero field whereby only that portion of said series of registers corresponding to the length of the left zero field is used, whereby each operation of a numeric key enters a digit into said register connected to said keyboard;
control means operated by said punch shaft;
means for actuating said punch clutch in response to each actuation of a numeric key;
means operated by said control means for entering a digit stored in each preceding register into the succeeding register and thereafter storing all digits entered into each register, in each register, whereby significant digits are entered into storage through said entry register and are moved into successive registers to successively displace zeros stored therein in accordance with the number of significant digits entered;
means connecting said read-out register to said interposer magnets for selecting said interposer magnets;
means operated by said control means for energizing an interposer magnet according to the selection thereof by said read-out register;
means responsive to actuation of said left zero-key for acutating said punch clutch to initiate a read-out, punch-out operation; and
means controlled by said program means for actuating said punch clutch until said left zero field has been punched whereby said control means causes any left zeros and any significant digits in said storage means to be transferred into and read from said read-out register in synchronism with operation of said punching mechanism.

8. The combination of claim 7 and comprising:
circuit means connecting said keyboard to said interposer magnets for manual punching operations and including switch means responsive to said program means for controlling the connection of said keyboard to said interposer magnets or to said registers through said field size switch means.

9. The combination of claim 7 and means for coding data entered into said storage means and a single decoder for decoding data read from said storage means.

10. The combination of claim 7 and an error reset key; and means responsive to operation of said error reset key for clearing any significant digits from said registers.

11. In a data recording machine having recording means comprising a plurality of selectively operable recording devices for recording data on a record and escapement means for advancing the record past said recording devices, the combination of:
a keyboard including numeric keys and a left zero key;
more than three registers each comprising an entry section and a storage section, said registers being connected in a series and including a read-out register at one end of the series, a second register having its storage section connected to the entry section of said read-out register, and a plurality of other registers each having its entry section adapted to receive data from said keyboard or from the storage section of the preceding register and a storage section for storing data from the entry section thereof;
program means defining the length and position of each left zero field to be recorded in the record;
field size switch means;
field control switch means controlled by said program means and operative to connect said keyboard to said recording means during manual recording and to disconnect said keyboard from said recording means during automatic left zero recording;
key entry switch means controlled by said program means and operative to connect said keyboard to said field size switch means during automatic left zero recording;
said field size switch means being controlled by said program means and being operative to connect said keyboard to the entry section of one of said other registers whereby only those registers in said series corresponding to the length of the left zero field being recorded are used;
a cyclically operated member;
selectively operated means for actuating said recording devices in response to operation of said member;
first means actuated by said member and operative during automatic left zero recording to first transfer data from said storage sections to the entry sections of succeeding registers and then to transfer data from said entry sections, including any data entered into said one other register from said keyboard, into the storage sections of the same registers;

second means actuated by said member and controlled by said left zero key for reading data serially from said read-out register into said selectively operated means for actuating said recording devices, in synchronism with movement of the record to record a left zero field therein in accordance with the data stored in said registers at the time of actuating said left zero key;

and means responsive to actuation of said left zero key for operating said member to effect a read-out and recording operation.

References Cited

UNITED STATES PATENTS

| | | | |
|---|---|---|---|
| 2,366,861 | 1/1945 | Lake et al. | 234—24 |
| 2,858,888 | 11/1958 | McGayhey et al. | 234—24 |
| 3,183,829 | 5/1965 | Kreidich | 234—24 |

WILLIAM W. DYER, Jr., *Primary Examiner.*

GERALD A. DOST, *Examiner.*